United States Patent [19]
Jefferson et al.

[11] Patent Number: 5,712,994
[45] Date of Patent: Jan. 27, 1998

[54] METHOD AND SYSTEM FOR APPARENT DIRECT EDITING OF TRANSIENT GRAPHIC ELEMENTS WITHIN A DATA PROCESSING SYSTEM

[75] Inventors: Kendall Jay Jefferson, Bedford; Kendall Allen Lock, Trophy Club, both of Tex.

[73] Assignee: International Business Machines Corporation, Armonk, N.Y.

[21] Appl. No.: 928,252

[22] Filed: Aug. 10, 1992

[51] Int. Cl.⁶ .................................................. G06F 3/14
[52] U.S. Cl. .......................................................... 395/342
[58] Field of Search ................................. 395/155, 156, 395/157, 158, 160, 135, 149, 153, 119, 120, 326, 333–347

[56] References Cited

U.S. PATENT DOCUMENTS

| | | | |
|---|---|---|---|
| 4,809,220 | 2/1989 | Carlson et al. | 395/117 |
| 4,845,665 | 7/1989 | Heath et al. | 395/333 |
| 5,041,992 | 8/1991 | Cunningham et al. | 395/135 |
| 5,047,959 | 9/1991 | Phillips et al. | 395/357 |
| 5,179,657 | 1/1993 | Dykstal et al. | 395/335 |
| 5,220,675 | 6/1993 | Padawer et al. | 395/334 X |
| 5,228,123 | 7/1993 | Heckel | 395/334 |
| 5,233,687 | 8/1993 | Henderson, Jr. et al. | 395/346 |
| 5,243,519 | 9/1993 | Andrews et al. | 395/758 |
| 5,283,867 | 2/1994 | Bayley et al. | 395/524 |
| 5,287,514 | 2/1994 | Gram | 395/333 |
| 5,293,470 | 3/1994 | Birch et al. | 395/135 |
| 5,337,403 | 8/1994 | Klingman | 395/140 |
| 5,394,521 | 2/1995 | Henderson, Jr. et al. | 395/346 |

OTHER PUBLICATIONS

Overson et al., Spontaneous Assembly, 1990, pp. 201–217, 1990.
Borland, Turbo Pascal, 1985, pp. 168–170, 1985.
Jensen et al., Harvard Graphics: The Complete Reference, 1990, pp. 584–609, 1990.
Stone, Preparing Art for Printing, 1983, pp. 140–143, 1983.
Weigand, Using Pagemaker, 1990, pp. 62–67, 1990.
Goodman, The Complete Hypercard Handbook, 1987, pp. 109–117, 123–128, 193–199, 281–293.
Jensen et al, Harvard Graphics: The Complete Reference, 1990, pp. 602–604.
Taylor, Object Vision 2.0 Developer's Guide, 1992, pp. 13–27.
P.C. Letter, Object Vision: User Programming for Windows, Dec. 1990, pp. 3–4.
Goodman, The Complete Hypercard Handbook, 1990, pp. 49 to 70, 133, 160 to 183.

*Primary Examiner*—Anton W. Fetting
*Attorney, Agent, or Firm*—Edward H. Duffield; Andrew J. Dillon

[57] ABSTRACT

The method and system of the present invention provides apparent direct editing of transient graphic elements displayed within an application in a data processing system. An editable overlay window is established within a data processing system. A transient graphic element is transient such that it is displayed within a main window in response to an occurrence within an application, and it cannot be individually edited directly in the main window. The transient graphic element is selected. The editable overlay window is then linked to the transient graphic element, such that the editable overlay window is displayed only in conjunction with the transient graphic element. The editable overlay window is then displayed directly over the transient graphic element. Thereafter, entries by a user into the editable overlay window give the appearance of editing the transient graphic element directly within the main window. In one disclosed embodiment of the present invention, the information displayed in the transient graphic element is initially copied into the editable overlay window prior to the establishment of the editable overlay window display such that this information may be edited.

7 Claims, 6 Drawing Sheets

Fig. 2

File    Edit    Utility

New Car Lot - Details

Car lot  Selected  Edit  View  Windows  Help

As of 10:00 a.m.                                   10 matches; 530 in stock

| Year | Make    | Model       | Price    | Buyers | VIN          |
|------|---------|-------------|----------|--------|--------------|
| 1991 | Watson  | Patriot     | $22,000  | 3      | 3422SRX5637  |
| 1991 | Hutton  | Sapphire LX | $14,400  | 3      | 8723EXE7237  |
| 1991 | Watson  | Faser GT    | $19,000  | 3      | 2354AGG7832  |
| 1991 | Watson  | Mudtruck    | $22,000  | 3      | 3422SRX2322  |
| 1991 | Watson  | Mudtruck    | $16,900  | 2      | 9832RMJ2373  |
| 1991 | Wheeler | PathWinder  | $29,100  | 2      | 2345AGG7892  |
| 1991 | Hutton  | ProSport    | $17,000  | 1      | 1990SEC0001  |
| 1991 | Auburn  | Sport GT    | $22,000  | 1      | 7832EXE1134  |

Great family car

Fig. 3

| Year | Make | Model | Price | Buyers | VIN |
|---|---|---|---|---|---|
| 1991 | Watson | Patriot | $22,000 | 3 | 3422SRX5637 |
| 1991 | Hutton | Sapphire LX | $14,400 | 3 | 8723EXE7237 |
| 1991 | Watson | Faser GT | $19,000 | 3 | 2354AGG7832 |
| 1991 | Watson | Mudtruck | $22,000 | 3 | 3422SRX2322 |
| 1991 | Watson | Mudtruck | $16,900 | 2 | 9832RMJ2373 |
| 1991 | Wheeler | PathWinder | $29,100 | 2 | 2345AGG7892 |
| 1991 | Hutton | ProSport | $17,000 | 1 | 1990SEC0001 |
| 1991 | Auburn | Sport GT | $22,000 | 1 | 7832EXE1134 |

New Car Lot - Details
Car lot  Selected  Edit  View  Windows  Help
As of 10:00 a.m.    10 matches; 530 in stock File  Edit  Utility Great family car

Fig. 4

New Car Lot - Details

Car lot   Selected   Edit   View   Windows   Help

As of 10:00 a.m.                    10 matches; 530 in stock

| Year | Make | Model | Price | Buyers | VIN |
|------|------|-------|-------|--------|-----|
| 1991 | Watson | Patriot | $22,000 | 3 | 3422SRX5637 |
| 1991 | Hutton | Sapphire LX | $14,400 | 3 | 8723EXE7237 |
| 1991 | Watson | Faser GT | $19,000 | 3 | 2354AGG7832 |
| 1991 | Watson | Mudtruck | $22,000 | 3 | 3422SRX2322 |
| 1991 | Watson | Mudtruck | $16,900 | 2 | 9832RMJ2373 |
| 1991 | Wheeler | PathWinder | $29,100 | 2 | 2345AGG7892 |
| 1991 | Hutton | ProSport | $17,000 | 1 | 1990SEC0001 |
| 1991 | Auburn | Sport GT | $22,000 | 1 | 7832EXE1134 |

Manufacturer recall 7/31/92

Fig. 5

| Year | Make | Model | Price | Buyers | VIN |
|------|------|-------|-------|--------|-----|
| 1991 | Watson | Patriot | $22,000 | 3 | 3422SRX5637 |
| 1991 | Hutton | Sapphire LX | $14,400 | 3 | 8723EXE7237 |
| 1991 | Watson | Faser GT | $19,000 | 3 | 2354AGG7832 |
| 1991 | Watson | Mudtruck | $22,000 | 3 | 3422SRX2322 |
| 1991 | Watson | Mudtruck | $16,900 | 2 | 9832RMJ2373 |
| 1991 | Wheeler | PathWinder | $29,100 | 2 | 2345AGG7892 |
| 1991 | Hutton | ProSport | $17,000 | 1 | 1990SEC0001 |
| 1991 | Auburn | Sport GT | $22,000 | 1 | 7832EXE1134 |

New Car Lot - Details

As of 10:00 a.m.         10 matches; 530 in stock

Excellent offroad vehicle

File  Edit  Utility

Car lot  Selected  Edit  View  Windows  Help

METHOD AND SYSTEM FOR APPARENT DIRECT EDITING OF TRANSIENT GRAPHIC ELEMENTS WITHIN A DATA PROCESSING SYSTEM

CROSS-REFERENCE TO RELATED APPLICATION

The present application is related to U.S. patent application Ser. No. 07,928,249, entitled "A Method and System for Apparent Direct Editing of Fixed Display Elements Within a Data Processing System," filed of even date herewith by the Inventors hereof and assigned to the assignee herein.

BACKGROUND OF THE INVENTION

1. Technical Field

The present invention relates in general to editing techniques within applications in a data processing system, and in particular to methods and systems for utilizing an editable overlay window for editing elements displayed by an application in a data processing system. Still more particularly, the present invention relates to a method and system for utilizing an editable overlay window for apparent direct editing of transient graphic elements displayed within a main window provided by an application within a data processing system.

2. Description of the Related Art

Transient graphic elements are display images which are not static on a computer display during the operation of an application. Transient graphic elements are "transient" in that they are presented on the video display in response to an occurrence within an application operating on a data processing system. Thus, a transient graphic element may be displayed in response to a predefined command, such as a cursor position, or the current state of the window and is generally removed from the display area as soon as it is no longer relevant to the current state of the window, or the current position of the cursor.

The use of transient graphic elements within computer based software applications is well known in the art. An example of a transient graphic element is an "information area" such as the one defined and used by Office Vision/2 an International Business Machines Corporation software product used within International Business Machines Corporation's Presentation Manager. Information areas are one line display areas placed within a display window provided by an application where information appears about the object or choice selected by a cursor. Information about the normal completion of a process may also appear in such an information area. For example, the information area may indicate that a file was successfully saved. Information areas may provide a simple one or two line help area for menu items in the action bar. In known systems, the user is not allowed to interact with the information area except to copy information from within it.

Graphic user interfaces are utilized in almost all computer systems today. Such interfaces typically utilize display management applications to control what is displayed including the size, position, priority, and number of active windows presented on a computer's video terminal display. In order to provide for user input, the display management application must have the capability to both obtain data and to display the information on the screen. In the past, such capabilities have been accomplished through utilization of input controls or dialog panels placed directly within the client area.

Individual input controls are simple tools, but they are not efficient when utilized in multiple numbers. A main window containing multiple input controls could be drawn using individual editable controls; however, the system would be slowed down significantly with each control displayed. This slowing of system processing occurs because more data processing is required to calculate and draw each individual control image. Generally, in order to avoid this problem, the entire main window is drawn with a single message rather than sending multiple display messages for all editable controls within the main window. This technique saves a great deal of processing time, but it prevents the user from typing directly into the main window of an application to edit individual controls or an information area.

Therefore, the controls and display elements, such as the information area described above are "fixed" within the main window image such that they cannot be individually edited or controlled. In known systems using this technique, the only way to change the display of a particular control within a window is to update and redraw the entire main window.

To allow user control and editing in known systems, dialog boxes may be utilized for controls within windows that do not directly accept user inputs. When a control requires user input, the application generally provides a new window at a separate location in which the selected control's dialog box is displayed. This dialog box allows direct user command of various controls within the dialog box. When editing of the dialog box is complete, the revised information is updated on the main window.

Unfortunately, there are a number of disadvantages to utilizing dialog boxes. When an application utilizes a dialog box, the application takes time to load, initialize, and then display the dialog box. Moreover, a user may be confused when the same information is displayed within two different windows and in two different formats. Thus, there is a need for an editing capability within an application which permits the user to perform apparent editing of a transient graphic element or control within the main window while maintaining the efficiency of processing and drawing only one display message to the main window.

SUMMARY OF THE INVENTION

It is therefore one object of the present invention to provide an improved editing technique for applications in a data processing system.

It is another object of the present invention to provide an improved method and system for utilizing an editable overlay window for editing elements displayed by an application in a data processing system.

It is yet another object of the present invention to provide an improved method and system for utilizing an editable overlay window for apparent direct editing of transient graphic elements displayed within a main widow provided by an application within a data processing system.

The foregoing objects am achieved as is now described. The method and system of the present invention provides apparent direct editing of transient graphic elements displayed within an application in a data processing system. An editable overlay window is established within a data processing system. A transient graphic element displayed within a main window which is fixed such that it cannot be individually edited directly in the main window is selected. The editable overlay window is then linked to the transient graphic element, such that the editable overlay window is displayed only in conjunction with the transient graphic element. The editable overlay window is then displayed directly over the transient graphic element. Thereafter, entries by a user into the editable overlay window give the appearance of editing the transient graphic element, directly within the main window. In one disclosed embodiment of the present invention, the information displayed in the transient graphic element is initially copied into the editable overlay window prior to the establishment of the editable overlay window display such that this information may be edited.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 illustrates a computer display screen containing an application's main window comprised of display elements including a transient graphic element in an information area in accordance with the preferred embodiment of the present invention;

FIG. 3 illustrates a computer display screen containing an application's main window where the information area has been overlayed by an editable overlay window in accordance with the preferred embodiment of the present invention;

FIG. 4 illustrates a computer display screen containing an application's main window comprised of display elements including an editable overlay window containing edited information overlaying the information area as is described in the method and system of the present invention;

FIG. 5 illustrates a computer display screen containing an application's main window comprised of display elements including a different transient graphic element in the information area as is described in the method and system of the present invention.

DETAILED DESCRIPTION OF PREFERRED EMBODIMENT

Figure 1:
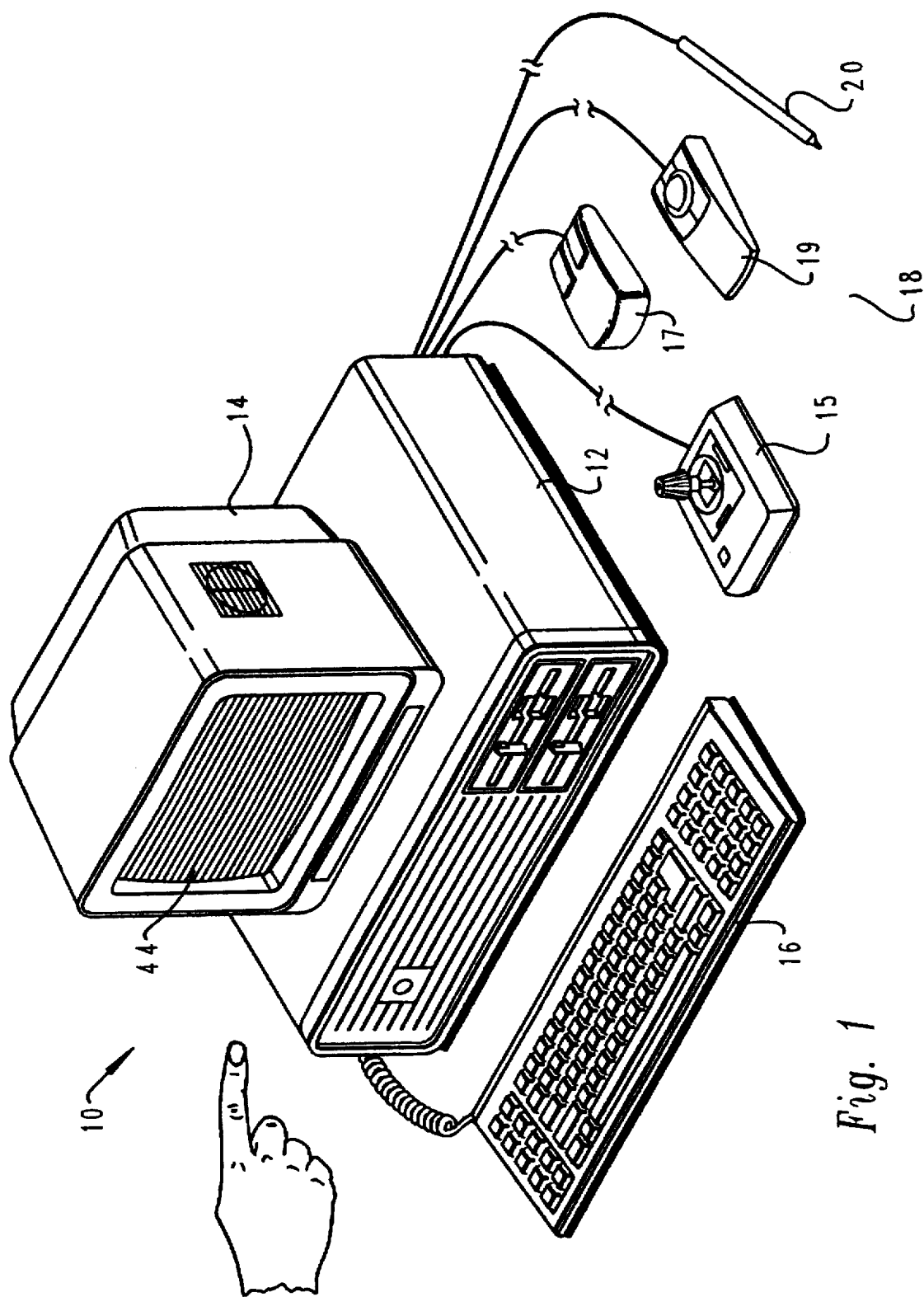
FIG. 1 is a pictorial representation of a personal computer system which may be utilized to implement the method and system of the present invention.

With reference now to the figures and in particular with reference to FIG. 1, there is depicted a pictorial representation of a personal computer system 10 which may be utilized to implement the method and system of the present invention. Personal computer system 10 preferably includes a system unit 12, computer display screen 14, keyboard 16, and multiple graphical input pointing devices 18. Those skilled in the art will appreciate that graphical input pointing devices 18 may be implemented utilizing a pointing stick 15, a mouse 17, a track ball 19, a light pen 20, touch display screen 44, or any other device that permits the user to manipulate objects in a graphical manner on display screen 14.

Referring now to FIG. 2, there is illustrated a pictorial representation of a computer display screen 44 which contains a menu bar 42 and a main window 40. Within main window 40 is illustrated an example of one application's output window. Information area 32 contains transient graphic element 30 which presents a short description of the selected item in window 40.

The application's main window contains various control and display elements which are "fixed" elements in that they are not editable from the main window within which they are displayed. This usually occurs when the application providing the main window is sending only one draw message to the video display to create the entire main window rather than sending individual messages for each control image displayed.

Referring now to FIG. 3, in accordance with the method and system of the present invention, editable overlay window 46 is created, sized to the dimensions of information area 32, and displayed directly overlaying information area 32 within main window 40 within display 44. Thereafter, editable overlay window 46 may be used to edit information, display information, or act as a command line interface.

The display of editable overlay window 46 is controlled by linking the editable overlay window 46 to the display of transient graphic element 30 within information area 32. When the application commands transient graphic element 30 to display, editable overlay window 46 appears overlaying transient graphic element 30 and when the application commands transient graphic element 30 to be removed, editable overlay window 46 disappears from display 44. Therefore, in the example shown in FIG. 3, editable overlay window 46 would be linked to the information area message "great family car" which is displayed whenever the Watson Patriot car is selected. Thereafter, whenever the display management application is commanded to display the information area message associated with the Watson Patriot, editable overlay window 46 is automatically displayed overlaying transient graphic element 30 in information area 32.

Referring now to FIG. 4, there is illustrated editable overlay window 46 displaying the edited information entered by the user during the edit mode. In this example, the information area message associated with the Watson Patriot car has been changed to read "manufacturer recall Jul. 31, 1992". Editable overlay window 46 will be displayed overlaying information area 32 when the Watson Patriot car is selected within the car listing in main window 40. In an alternative embodiment, transient graphic element 30 may be edited or updated such that the edited information in editable overlay window 46 replaces the information previously contained in transient graphic element 30.

Referring now to FIG. 5 there is illustrated the display of a different transient graphic element 48 within information area 32. The user has selected a new car within the car list in main window 40. Therefore, transient graphic element 30 has been removed from information area 32, editable overlay window 46 has also been removed because of the linkage established with transient graphic element 30, and transient graphic element 48 which is associated with the Wheeler PathWinder truck is displayed within information area 32.

Figure 6:
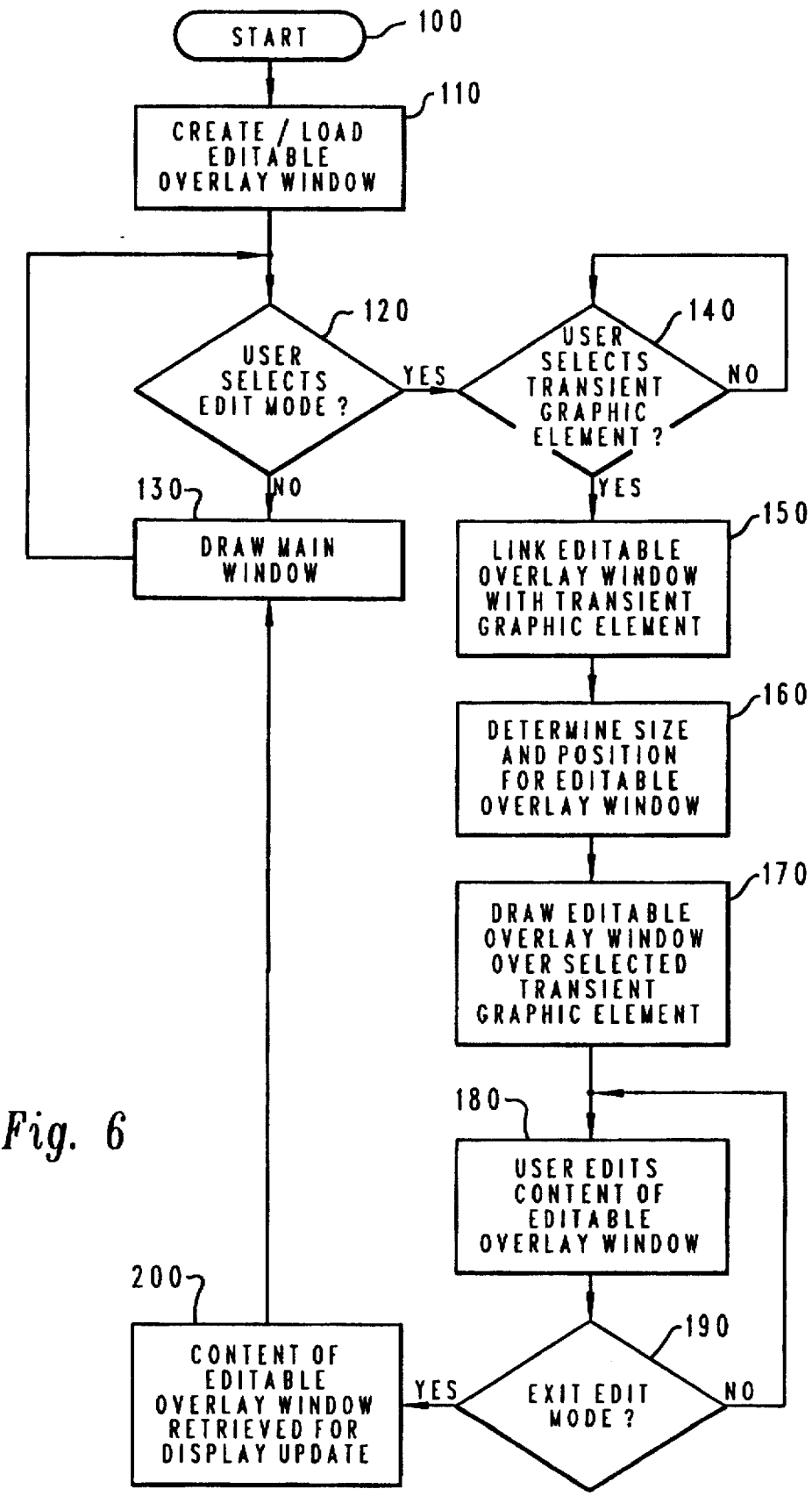
FIG. 6 is a high level flowchart depicting a method and system of editing a transient graphic element be apparent direct editing using an editable overlay window in accordance with a preferred embodiment of the present invention.

Referring now to FIG. 6, there is depicted a high-level flowchart representing the utilization of the method and system of the present invention wherein an editable overlay window may be created and displayed in order to provide apparent direct editing of a transient graphic element displayed within a main window. As is illustrated, the method begins at block 100. Thereafter, as illustrated at block 110, an editable overlay window is established and loaded into the computer's active memory by the data processing system. The editable overlay window created may be a display for graphical information such as a bitmap image, a command line interface, a small window with several controls, or a single control, such as an entry field. This editable overlay window may be established in any manner typically utilized in the creation of window displays in window based applications, or in any other manner known to those having skill in the art.

Thereafter, as illustrated in block 120, the user or the system is queried to determine whether an edit mode has been selected whereby the user would be allowed to edit elements displayed in the main window. In one embodiment of the present invention, the data processing system may prompt the user on whether or not to enter the edit mode. In another embodiment, the system may initiate the edit mode after receiving a selected command from the user, such as a series of keyboard key commands or a mouse driven command. If, as illustrated in block 120 a determination is made that the edit mode should not be entered, the process passes to block 130, a draw message containing the current information of the main window is sent to the display by the display management application, in a manner typically utilized in the creation of graphic objects within a computer display.

In the event the determination illustrated within block 120 indicates that the edit mode should be entered, then the process passes to block 140, which illustrates the user or system selecting a transient graphic element or elements displayed within the main window to edit. Selected transient graphic elements may include displayed text, an icon which is to be edited to create a different image, titles or headings to be changed, actual system controls, or data entry ports.

As depicted at block 150, the editable overlay window is then logically linked to the transient graphic element so that display of the editable overlay window is controlled by the display of the transient graphic element. This linking or slaving of the display of the editable overlay window to the display of the transient graphic element brings the editable overlay window into view within the main window whenever the transient graphic element is commanded to display, and removes it from view whenever the transient graphic element is commanded out of view.

Thereafter, the method continues, as illustrated in block 160, to determine the correct size and shape of the editable overlay window so that it equals the dimensions of the transient graphic element selected. Also, the position on the computer display screen at which the editable overlay window should be displayed in order to overlay the selected transient graphic element within the main window is determined. In an alternative embodiment, information such as an icon or text which is already displayed within the transient graphic element may be copied into the editable overlay window.

The method continues, as illustrated in block 170, to display the editable overlay window directly over the transient graphic element, such that it overlays the transient graphic element either partially or completely. In this manner, the editable overlay window may appear transparent to the user appearing as an empty window displayed within the main window. Alternatively, the editable overlay window may be visually contrasted from the transient graphic element by utilization of a visual distinction, such as a different background color.

Next, block 180 depicts the user editing the content of the editable overlay window. Entries into the editable overlay window will appear to the user to be direct editing of the transient graphic element within the main window, despite the fact that the user is only editing the editable overlay window.

When the editing of the editable overlay window has been completed, the edit mode is terminated. Block 190 depicts a determination of whether or not an exit from the edit mode has been selected. Preferably, an exit from the edit mode may be scheduled in response to a user input such as a keyboard or mouse driven command.

Finally, as depicted within block 200, the content of the editable overlay window which was created by the user while in the edit mode is retrieved by the data processing system. The display message sent by the display management application is then updated to reflect the edited information in a manner such that the main window is redrawn to show the edited element. In an alternative embodiment, the display message for the main window is not updated and the edited information is merely retained within the editable overlay window.

Upon reference to the foregoing, those skilled in the art will appreciate that the method and system of the present invention may be utilized to present a user of a data processing system with the illusion of having the capability to change, edit, or control transient graphic elements, images or controls directly within a main window. By creating an editable overlay window which may appear as any one of many transient graphic elements within a main window, linking that editable overlay window with a selected transient graphic element so that it is displayed only in conjunction with the editable overlay window, and accessing that editable overlay window in order to create edited information, a method of editing transient graphic elements displayed within a main window is performed.

While the invention has been particularly shown and described with reference to a preferred embodiment, it will be understood by those skilled in the art that various changes in form and detail may be made therein without departing from the spirit and scope of the invention.

We claim:

1. A method of apparent direct editing of a graphic element displayed within a main window being provided by an application within a data processing system, said method comprising the data processing system implemented steps of:

creating an editable overlay window, wherein said editable overlay window allows its shape or its contents to be edited;

in response to the selection of a first graphic element displayed within a main window that is a separate and distinct window from said editable overlay window, and wherein the main window contains at least two graphic elements including the first graphic element and a second graphic element, and is being provided by an application within a data processing system, and further wherein said first graphic element is displayed in the main window during multiple periods which are less than the period of display of the main window, sizing and shaping said editable overlay window so that said editable overlay window equals the dimensions of said first graphic element, and overlaying said editable overlay window over said main window so that said editable overlay window is precisely positioned such that said first graphic element is no longer displayed such that portions of said main window including the second graphic element remain displayed;

permitting a user to create and edit information within said editable overlay window, wherein, because the dimensions of said editable overlay window are indistinguishable from said selected first graphic element, it appears from visual observation by a user of the displayed portions of the main window that said first graphic element is being edited directly within said main window when, in fact, information is created and edited by said user in said editable overlay window; and linking display of said editable overlay window to the display of said first graphic element wherein said editable overlay window is displayed only when said first graphic element is displayed within said main window.

2. A method of apparent direct editing of a graphic element displayed within a main window provided by an application within a data processing system according to claim 1, wherein editable information is created within the editable overlay window by said user, further including the steps of retrieving the information contained in said editable overlay window, updating the information contained in said main window such that the retrieved information replaces information used to draw the graphic element and redisplaying said main window.

3. A method of apparent direct editing of a graphic element displayed within a main window provided by an application within a data processing system according to claim 1, further in response to the selection of a graphic element displayed within a main window, retrieving information used to generate the visual display of said graphic element and generating the visual display of said graphic element in said editable overlay window so that said information is displayed by said editable overlay window when said editable overlay is displayed.

4. A method according to claim 3, wherein said information in said editable overlay window is displayed such that said editable overlay window is visually indistinguishable from said transient graphic element.

5. A method of apparent direct editing of a graphic element displayed within a main window provided by an application within a data processing system according to claim 1, wherein said graphic element is a bitmap image.

6. A method of apparent direct editing of a graphic element displayed within a main window provided by an application within a data processing system according to claim 1, wherein said graphic element is comprised of alphanumeric characters.

7. A data processing system for apparent direct editing of a graphic element displayed within a main window provided by an application, said data processing system comprising:

means for creating an editable overlay window, wherein said editable overlay window allows its shape or its contents to be edited;

means for, in response to the selection of a first graphic element displayed within a main window that is a separate and distinct window from said editable overlay window, and wherein the main window contains at least two graphic elements including the first graphic element and a second graphic element, and is being provided by an application within a data processing system, and further wherein said first graphic element is displayed in the main window during multiple periods which are less than the period of display of the main window, sizing and shaping said editable overlay window so that said editable overlay window equals the dimensions of said first graphic element, and overlaying said editable overlay window over said main window so that said editable overlay window is precisely positioned such that said first graphic element is no longer displayed such that portions of said main window including the second graphic element remain displayed;

means for permitting a user to create and edit information within said editable overlay window, wherein, because the dimensions of said editable overlay window are indistinguishable from said selected first graphic element, it appears from visual observation by a user of the display portions of the main window that said first graphic element is being edited directly within said main window when, in fact, information is created and edited by said user in said editable overlay window; and means for linking display of said editable overlay window to the display of said first graphic element wherein said editable overlay window is displayed only when said first graphic element is displayed within said main window.

\* \* \* \* \*